US010981600B2

(12) United States Patent
Yamada et al.

(10) Patent No.: US 10,981,600 B2
(45) Date of Patent: Apr. 20, 2021

(54) VEHICLE DRIVE UNIT

(71) Applicant: Honda Motor Co., Ltd., Tokyo (JP)

(72) Inventors: Satoshi Yamada, Wako (JP); Makoto Tsuchihashi, Wako (JP); Makoto Nishida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/792,845

(22) Filed: Feb. 17, 2020

(65) Prior Publication Data

US 2020/0262481 A1    Aug. 20, 2020

(30) Foreign Application Priority Data

Feb. 20, 2019    (JP) .............................. JP2019-028083

(51) Int. Cl.
*B62D 21/11* (2006.01)
*B60K 17/16* (2006.01)
*B60K 1/00* (2006.01)

(52) U.S. Cl.
CPC ................ *B62D 21/11* (2013.01); *B60K 1/00* (2013.01); *B60K 17/16* (2013.01)

(58) Field of Classification Search
CPC .......... B62D 21/11; B60K 17/16; B60K 1/00; B60K 17/06
See application file for complete search history.

(56) References Cited

U.S. PATENT DOCUMENTS

| | | | |
|---|---|---|---|
| 7,520,514 B2 * | 4/2009 | Ogawa ..................... | B60G 3/20 180/312 |
| 7,584,815 B2 * | 9/2009 | Ogawa ..................... | B60G 3/20 180/312 |
| 9,085,234 B2 * | 7/2015 | Saneyoshi .............. | B62D 21/11 |
| 9,387,751 B2 * | 7/2016 | Kashiwai ................. | B60K 1/00 |
| 9,610,979 B2 * | 4/2017 | Hirano ................. | B60K 5/1216 |
| 9,776,662 B2 * | 10/2017 | Hirano ................. | B60K 5/1216 |
| 10,046,634 B2 * | 8/2018 | Takahashi ............ | B60K 5/1216 |
| 10,179,609 B2 | 1/2019 | Stenzenberger et al. | |
| 10,625,591 B2 * | 4/2020 | Nishikawa ............. | B60K 6/405 |
| 10,717,468 B2 * | 7/2020 | Hara ..................... | B62D 21/152 |
| 2004/0222030 A1 * | 11/2004 | Szalony ................. | B62D 21/11 180/311 |

(Continued)

FOREIGN PATENT DOCUMENTS

DE    102011016624 A1    10/2012
DE    102013210576 A1    12/2014

(Continued)

*Primary Examiner* — Jacob B Meyer
(74) *Attorney, Agent, or Firm* — Duft & Bornsen, PC

(57) ABSTRACT

A vehicle drive unit is supported by a vehicle frame of a vehicle. The vehicle drive unit includes a housing including a first case and a second case integrally joined together along a coupling plane to form a sealed space therein, a drive member accommodated in the sealed space to generate a travel driving force of the vehicle, and a mount member interposed between the housing and the vehicle frame to support the housing from the vehicle frame. The first case and the second case respectively include a first attachment portion and a second attachment portion to which the mount member is attached, and the first attachment portion and the second attachment portion are installed in a single region intersecting with the coupling plane.

10 Claims, 11 Drawing Sheets

(56) References Cited

U.S. PATENT DOCUMENTS

| | | | |
|---|---|---|---|
| 2006/0260860 A1* | 11/2006 | Byers | F16D 3/06 180/291 |
| 2007/0024044 A1* | 2/2007 | Ogawa | B62D 21/11 280/788 |
| 2012/0313361 A1* | 12/2012 | Saneyoshi | B62D 25/20 280/834 |
| 2014/0245860 A1* | 9/2014 | Kimura | B60K 1/00 74/606 R |
| 2019/0217700 A1* | 7/2019 | Nishizawa | B60K 1/00 |
| 2020/0231050 A1* | 7/2020 | Hirukawa | B60K 1/00 |
| 2020/0238814 A1* | 7/2020 | Kodama | B60K 5/1216 |
| 2020/0262481 A1* | 8/2020 | Yamada | B60K 1/00 |

FOREIGN PATENT DOCUMENTS

| | | | |
|---|---|---|---|
| JP | S5485625 U | 6/1979 | |
| JP | 2000108696 A | 4/2000 | |

* cited by examiner

VEHICLE DRIVE UNIT

CROSS-REFERENCE TO RELATED APPLICATION

This application is based upon and claims the benefit of priority from Japanese Patent Application No. 2019-028083 filed on Feb. 20, 2019, the content of which is incorporated herein by reference.

BACKGROUND OF THE INVENTION

Field of the Invention

This invention relates to a vehicle drive unit supported by a vehicle body.

Description of the Related Art

As a conventional unit of this type is known one wherein a pair of adjacently installed cases (a clutch housing and a transmission case) are fasten to a vehicle body through a bar-shaped support member and a buffer member provided in the middle of the support member. Such a unit is described, for example, in JPS54-85625U. In the unit taught by JPS54-85625U, the support member is bolted to the clutch housing at its one end and to the transmission case at its other end.

However, when a structure is adopted that supports a pair of cases from the vehicle body through a bar-shaped support member as in the unit disclosed in JPS54-85625U, loads from the body that differ in size and direction tend to act on the respective cases through the support member. The fastened regions of the pair of cases are therefore apt to deform and cause loss of sealing performance and the like between the cases.

SUMMARY OF THE INVENTION

An aspect of the present invention is a vehicle drive unit supported by a vehicle frame of a vehicle. The vehicle drive unit includes a housing including a first case and a second case integrally joined together along a coupling plane to form a sealed space therein, a drive member accommodated in the sealed space to generate a travel driving force of the vehicle, and a mount member interposed between the housing and the vehicle frame to support the housing from the vehicle frame. The first case and the second case respectively include a first attachment portion and a second attachment portion to which the mount member is attached, and the first attachment portion and the second attachment portion are installed in a single region intersecting with the coupling plane.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1A:
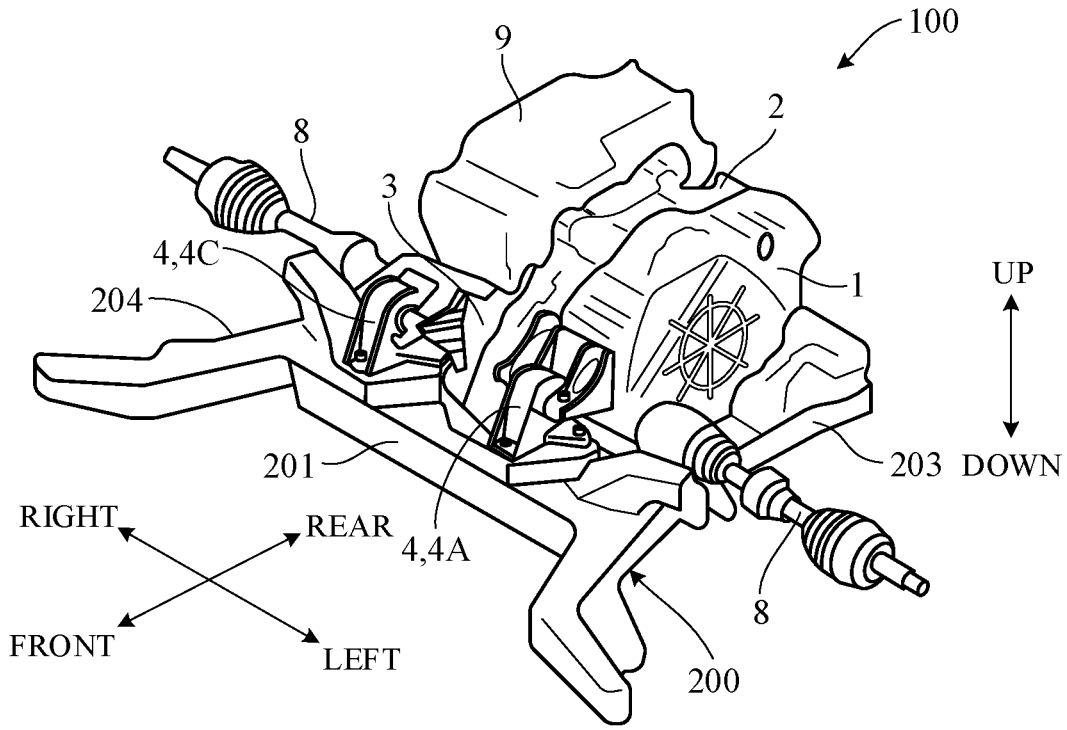
FIG. 1A is a perspective diagram showing an example of attachment of a vehicle drive unit in accordance with an embodiment of the present invention to a vehicle frame and viewing the vehicle drive unit diagonally forward.
Figure 1B:
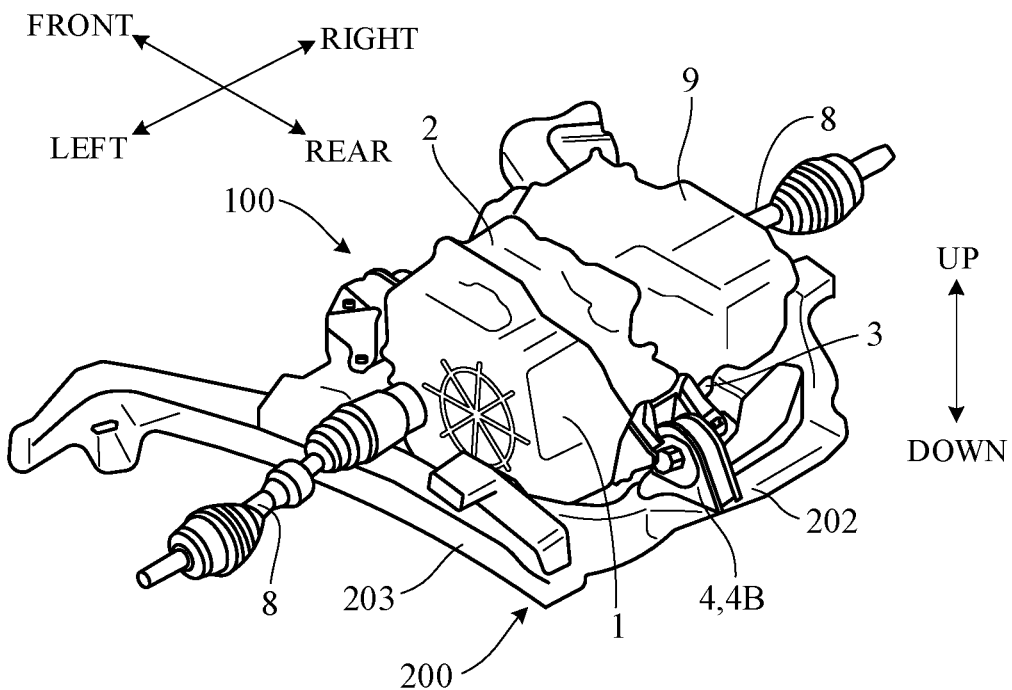
FIG. 1B is a perspective diagram showing an example of attachment of a vehicle drive unit in accordance with an embodiment of the present invention to a vehicle frame and viewing the vehicle drive unit diagonally rearward.
Figure 2:
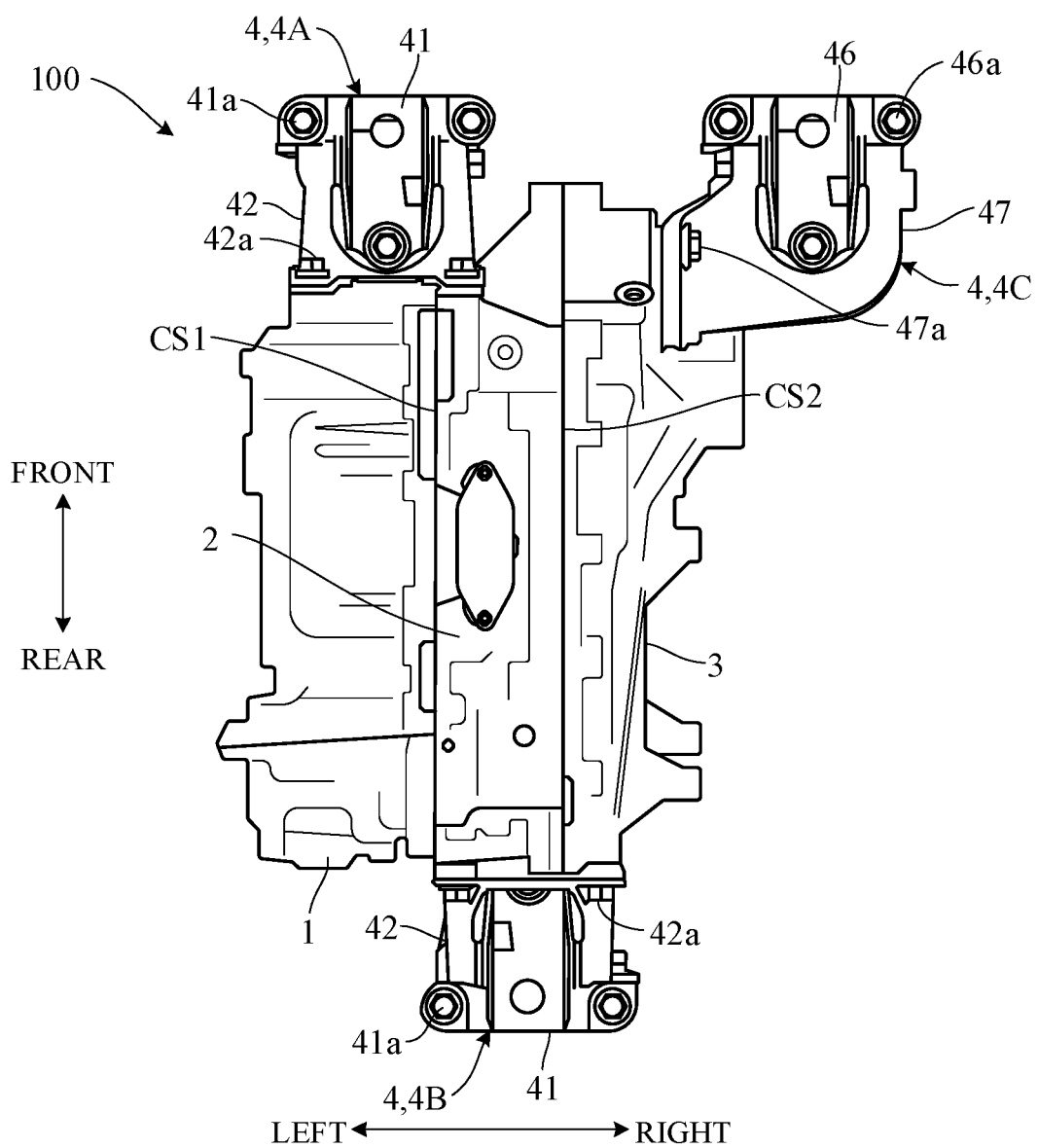
FIG. 2 is a plan diagram of a vehicle drive unit in accordance with an embodiment of the present invention.

An embodiment of the present invention is explained with reference to FIGS. 1A to 11 in the following. FIGS. 1A and 1B are perspective diagrams showing an example of attachment of a vehicle drive unit 100 in accordance with an embodiment of the present invention to a vehicle frame 200, and FIG. 2 is a plan diagram showing overall structure of the vehicle drive unit 100 by itself. For the purposes of the ensuing description, front-back direction, left-right direction and up-down direction are defined as illustrated and the structural constituents are explained in the following using these definitions. Front-back direction corresponds to vehicle longitudinal direction, left-right direction corresponds to vehicle lateral direction, and up-down direction corresponds to vehicle vertical direction. FIGS. 1A, 1B and 2 are respectively diagrams viewing the vehicle drive unit 100 diagonally forward left, diagonally rearward left, and from above.

As indicated in FIGS. 1A, 1B and 2, the vehicle drive unit 100 comprises a motor cover 1, a gear case 2 installed rightward of the motor cover 1, a gear cover 3 installed rightward of the gear case 2, and multiple mounts (mount members) 4 for fastening the vehicle drive unit 100 to the vehicle frame 200. A right end surface of the motor cover 1 and a left end surface of the gear case 2 abut each other and are integrally joined by multiple circumferentially spaced bolts (not shown). A right end surface of the gear case 2 and a left end surface of the gear cover 3 abut each other and are integrally joined by multiple circumferentially spaced bolts (not shown).

As indicated in FIG. 2, a faying interface between the motor cover 1 and gear case 2 and a faying interface between the gear case 2 and gear cover 3 are designated coupling plane CS1 and coupling plane CS2, respectively. The coupling planes CS1 and CS2 are parallel and each is formed along a vertical plane extending in front-back direction and up-down direction. As a whole, the motor cover 1, gear case 2 and gear cover 3 joined via the coupling planes CS1 and CS2 form a housing. As shown in FIGS. 1A and 1B, a power control unit 9 is provided rightward of the gear cover 3.

As illustrated in FIG. 2, the mounts 4 include a first mount 4A provided at left front end portion of the vehicle drive unit 100, a second mount 4B provided at back end portion thereof, and a third mount 4C provided at right front end portion thereof. The vehicle drive unit 100, is a unit for driving rear wheels and is equipped with an electric motor as a vehicle power source. As shown in FIGS. 1A and 1B, the vehicle drive unit 100 is mounted on the vehicle frame 200 (namely, rear frame located toward back of the vehicle) by means of the three mounts 4A to 4C.

More specifically, the vehicle frame 200 comprises a front frame portion 201 and a rear frame portion 202 that extend laterally as a longitudinally spaced pair and additionally comprises a left frame portion 203 and a right frame portion 204 that extend longitudinally to interconnect the left end portions and the right end portions of the front frame portion 201 and back frame portion 202, thereby forming a frame-like structure of roughly rectangular shape in plan view. The first mount 4A and third mount 4C on the front side are fastened to upper surface of the front frame portion 201 and the second mount 4B on the back side is fastened to upper surface of the back frame portion 202.

Figure 3:
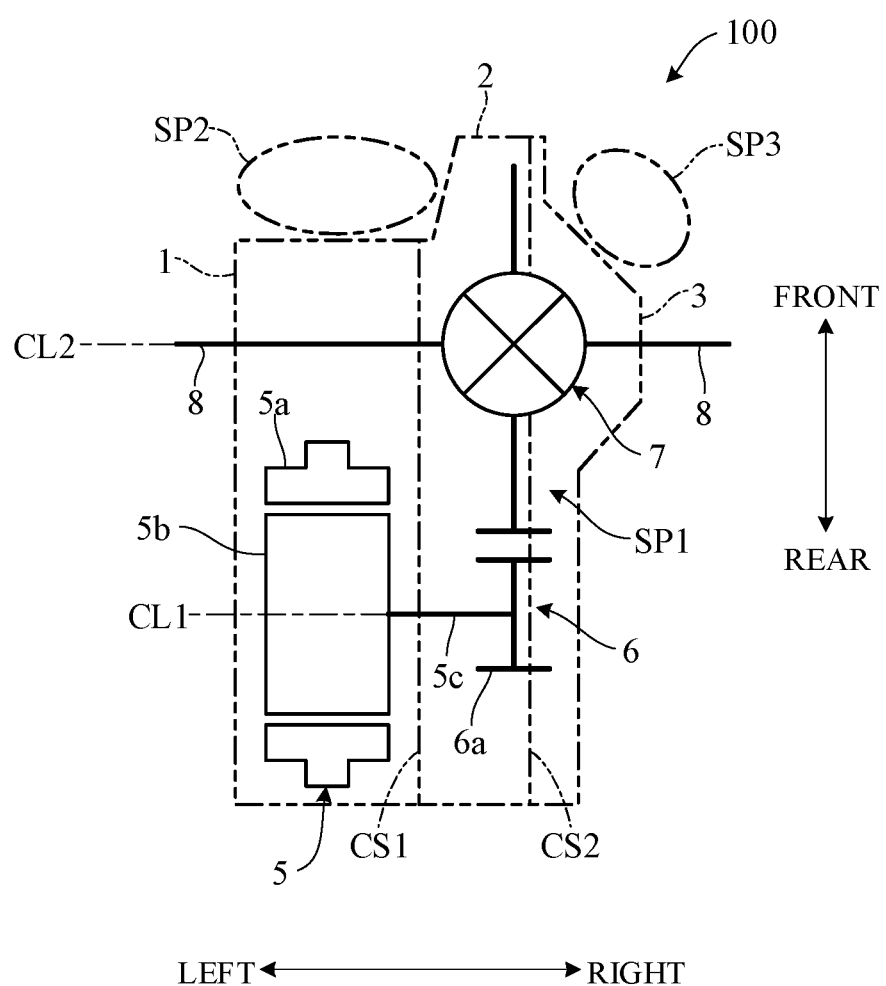
FIG. 3 is a diagram schematically illustrating internal configuration of the vehicle drive unit of FIG. 2.

FIG. 3 is a diagram schematically illustrating internal configuration of the vehicle drive unit 100. As shown in FIG. 3, the vehicle drive unit 100 comprises an electric motor 5, a transmission 6 and a differential mechanism 7. The electric motor 5 comprises a roughly cylindrical stator 5a centered on a laterally extending axis CL1 and a rotor 5b positioned inside the stator 5a to rotate around the axis CL1. Rotational output of a rotating shaft 5c of the rotor 5b varied in speed ratio by a transmission 6 having a gear 6a is input to the differential mechanism 7. Rotation input to the differential mechanism 7 is distributed between a pair of left and right drive shafts 8 extending along a lateral axis CL2, thereby driving the rear wheels and propelling the vehicle. As shown in FIGS. 1A and 1B, the drive shafts 8 pass over the vehicle frame 200 (left frame portion 203 and right frame portion 204) and extend to the left and right.

The coupling plane CS1 between the motor cover 1 and gear case 2 and the coupling plane CS2 between the gear case 2 and gear cover 3 are sealed to establish a hermetically sealed space SP1 enclosed by the motor cover 1, gear case 2 and gear cover 3. The electric motor 5, transmission 6 and differential mechanism 7 are accommodated in the hermetically sealed space SP1. The electric motor 5 is housed mainly inside the motor cover 1, the transmission 6 is housed mainly inside the gear case 2, and the differential mechanism 7 is housed mainly inside the gear cover 3. Oil used as lubricating oil, coolant oil and the like is also sealed in the hermetically sealed space SP1.

Figure 4:
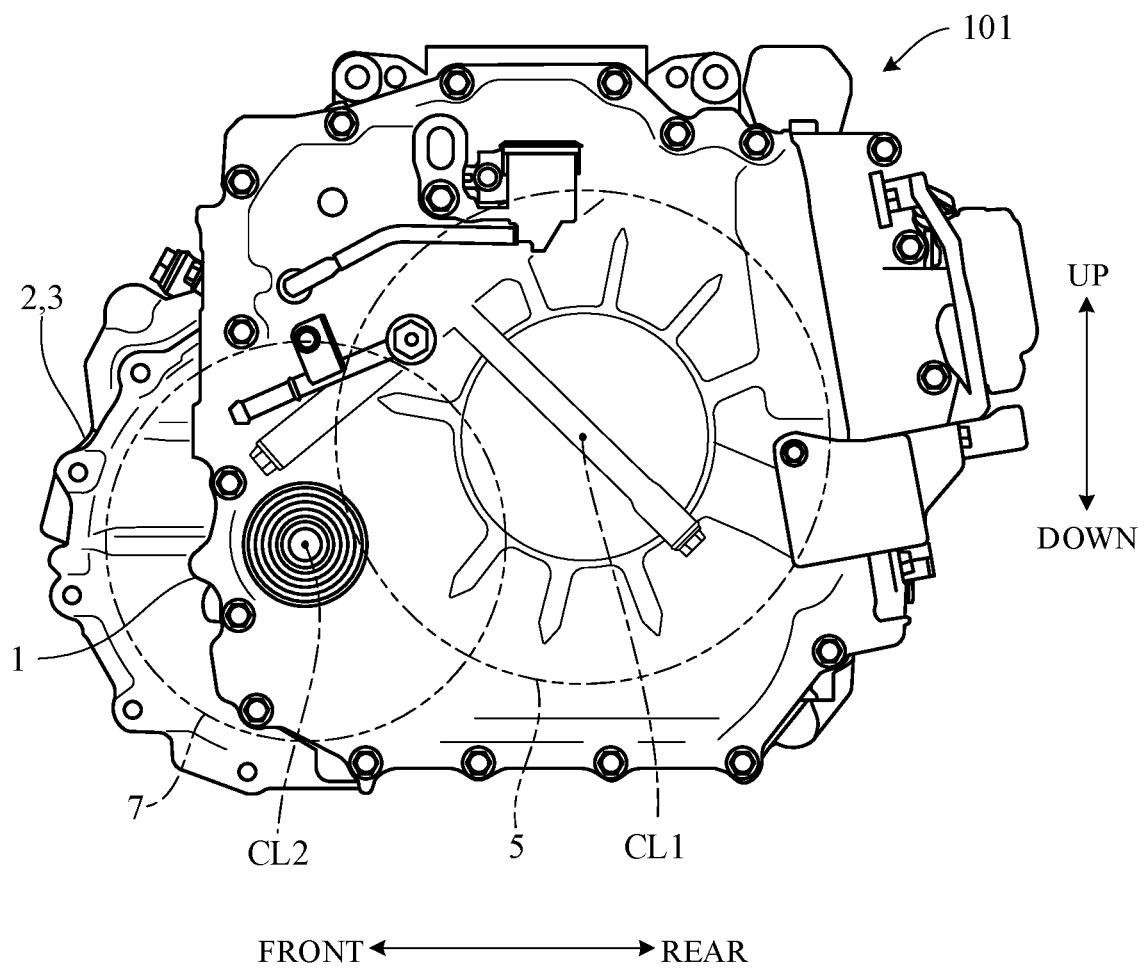
FIG. 4 is a side view of a case of a vehicle drive unit in accordance with an embodiment of the present invention.

FIG. 4 is a side view of the case 101 of the vehicle drive unit 100 viewed from the left. In FIG. 4, positions of the electric motor 5 and the differential mechanism 7 installed inside the case 101 are indicated by double-dot chain lines. As shown in FIG. 4, rotational axis of the differential mechanism 7 (lateral axis CL2) is located forward and downward of the rotational axis of the electric motor 5 (axis CL1). Lower side front end portions of the gear case 2 and gear cover 3 are therefore projected forward of the motor cover 1 with consideration to the shape of the differential mechanism 7. As a result, as shown in FIG. 3, surplus space SP2 is formed forward of the motor cover 1, and surplus space SP3 is formed at right front of the gear cover 3 above the differential mechanism 7.

As external force from the vehicle frame 200 transmits through the mounts 4 to act on the vehicle drive unit 100 of the aforesaid structure, high rigidity and strength of the motor cover 1, gear case 2 and gear cover 3 (hereinafter called "case components") needs to be ensured. However, owing to the fact that the case components are produced by aluminum die casting, for example, increasing case component wall thickness is not a practical option for achieving higher rigidity and strength because it is apt to degrade casting quality. Overall rigidity and strength of the case 101 therefore need to be enhanced with minimal increase in wall thickness. Moreover, oil is sealed in the hermetically sealed space SP1, so that relative displacement between case components must be minimized in order to ensure good sealing performance. In the present embodiment, taking the aforesaid points into account, the case 101 is formed with attachment portions for the mounts 4 as set out below.

Figure 5A:
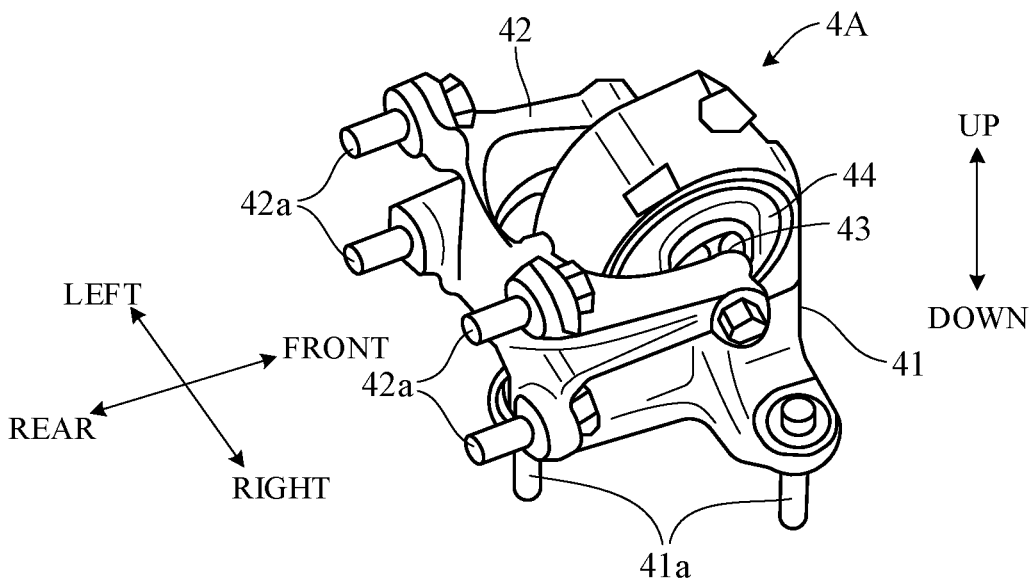
FIG. 5A is a perspective diagram showing structure of a mount of the vehicle drive unit of FIG. 2.

Turning first to an explanation of the structure of the mounts 4, FIG. 5A is a perspective diagram showing structure of the first mount 4A. As shown in FIGS. 2 and 5A, the first mount 4A has a base 41 and a bracket 42. Bottom of the base 41 is fastened to top of the vehicle frame 200 by multiple (e.g., three) bolts 41a. The bracket 42 is attached to the base 41 so as to be vertically pivotable around a pivot shaft 43 extending laterally through upper part of the base 41. The pivot shaft 43 is supported on the base 41 through a shock-absorbing rubber bushing 44. Rear end surface of the bracket 42 is attached to front surface of case components (motor cover 1 and gear case 2) of the vehicle drive unit 100 by multiple (e.g., four) bolts 42a. Faying surfaces of the bolts 42a lie on one and the same plane. Rear end surface of the bracket 42 exhibits a roughly rectangular shape overall.

Structure of the second mount 4B is the same as that of the first mount 4A and differs from the first mount 4A only in attachment direction. Namely, as shown in FIG. 2, the second mount 4B has a base 41 fastened to top of the vehicle frame 200 by bolts 41a and a bracket 42 attached to the base 41 to be vertically pivotable around a pivot shaft at upper part of the base 41. Front end surface of the bracket 42 is attached to back surface of case components (gear case 2 and gear cover 3) of the vehicle drive unit 100 by multiple bolts 42a.

Figure 5B:
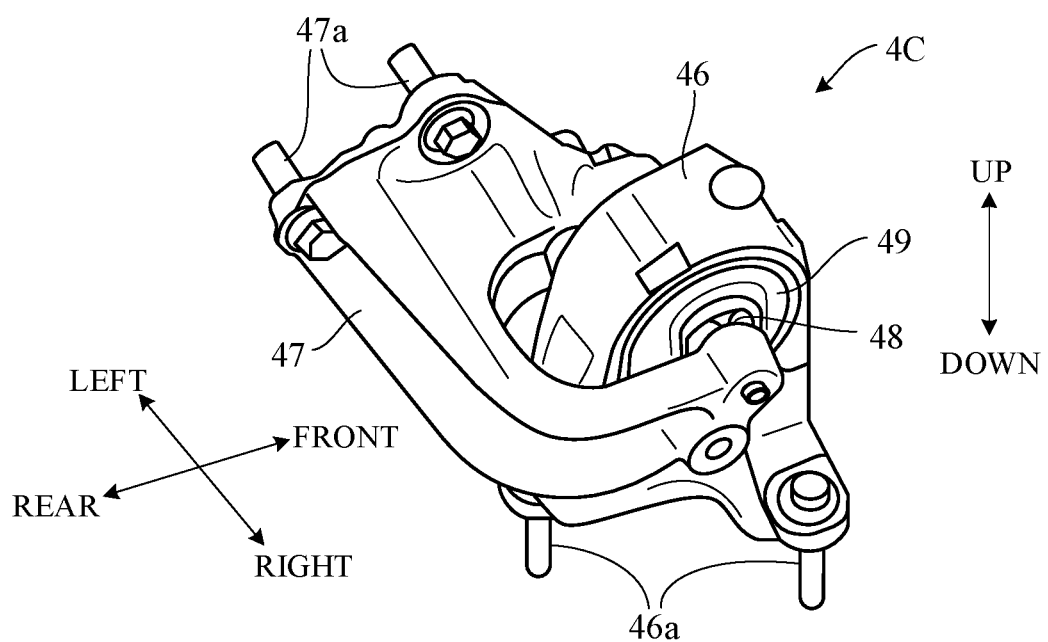
FIG. 5B is a perspective diagram showing structure of a mount different from FIG. 5A of the vehicle drive unit of FIG. 2.

FIG. 5B is a perspective diagram showing structure of the third mount 4C. As shown in FIGS. 2 and 5B, the third mount 4C has a base 46 and a bracket 47. The base 46 has the same shape as the base 41 and its bottom is fastened to top of the vehicle frame 200 by multiple bolts 46a. In a manner similar to the bracket 42, the bracket 47 is attached to the base 46 so as to be vertically pivotable around a pivot shaft 48 extending laterally through a shock-absorbing rubber bushing 49 at upper part of the base 46. The bracket 47 is installed to extend leftward and its left end surface is fastened to right end surface of a case component (gear cover 3) of the vehicle drive unit 100 by multiple (e.g., four) bolts 47a. Faying surfaces of the bolts 47a lie on one and the same plane.

Figure 6:
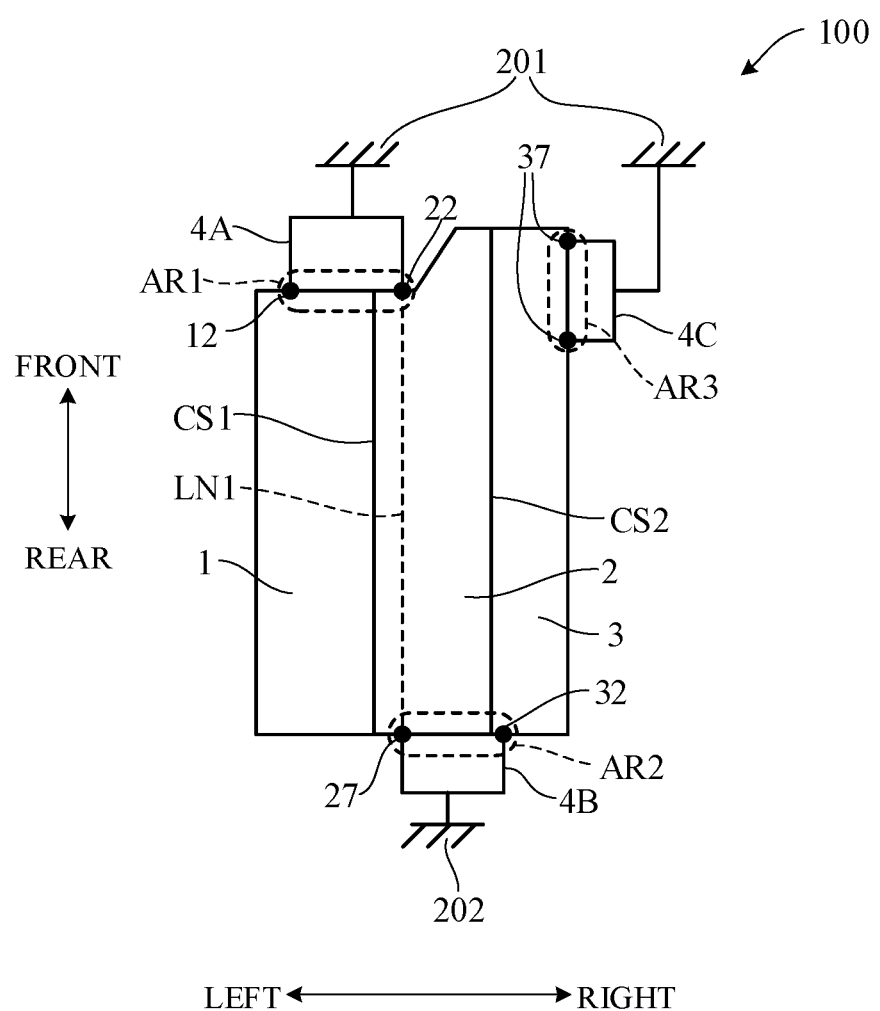
FIG. 6 is a plan view showing a simplified model of essential components of a vehicle drive unit in accordance with an embodiment of the present invention.

FIG. 6 is a plan view showing a simplified model of essential components of the vehicle drive unit 100 according to the present embodiment. As indicated in FIG. 6, the first mount 4A is attached in a first attachment region AR1 (dotted line region) intersecting with the coupling plane CS1 of the motor cover 1 and gear case 2 and extending laterally at the front end surfaces of the motor cover 1 and gear case 2. Hereinafter, "intersecting with the coupling plane" is referred to "straddling the coupling plane". The second mount 4B is attached in a second attachment region AR2 (dotted line region) straddling the coupling plane CS2 of the gear case 2 and gear cover 3 and extending laterally at the rear end surfaces of the gear case 2 and gear cover 3. The third mount 4C is attached in a third attachment region AR3 (dotted line region) extending longitudinally at front end portion of right end surface of the gear cover 3.

Figure 7:
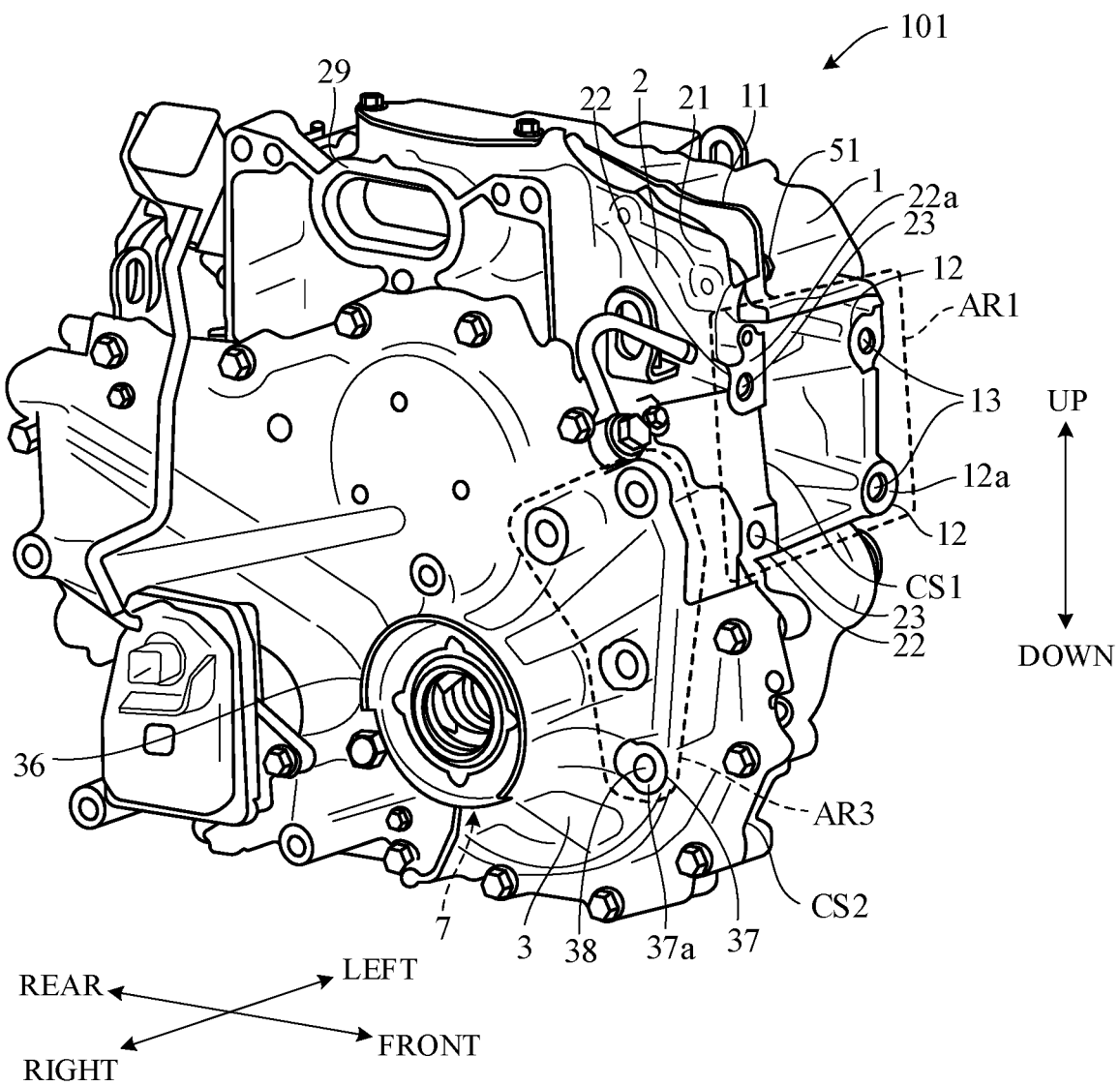
FIG. 7 is a perspective diagram viewing a case of a vehicle drive unit in accordance with an embodiment of the present invention from obliquely right-forward.
Figure 8:
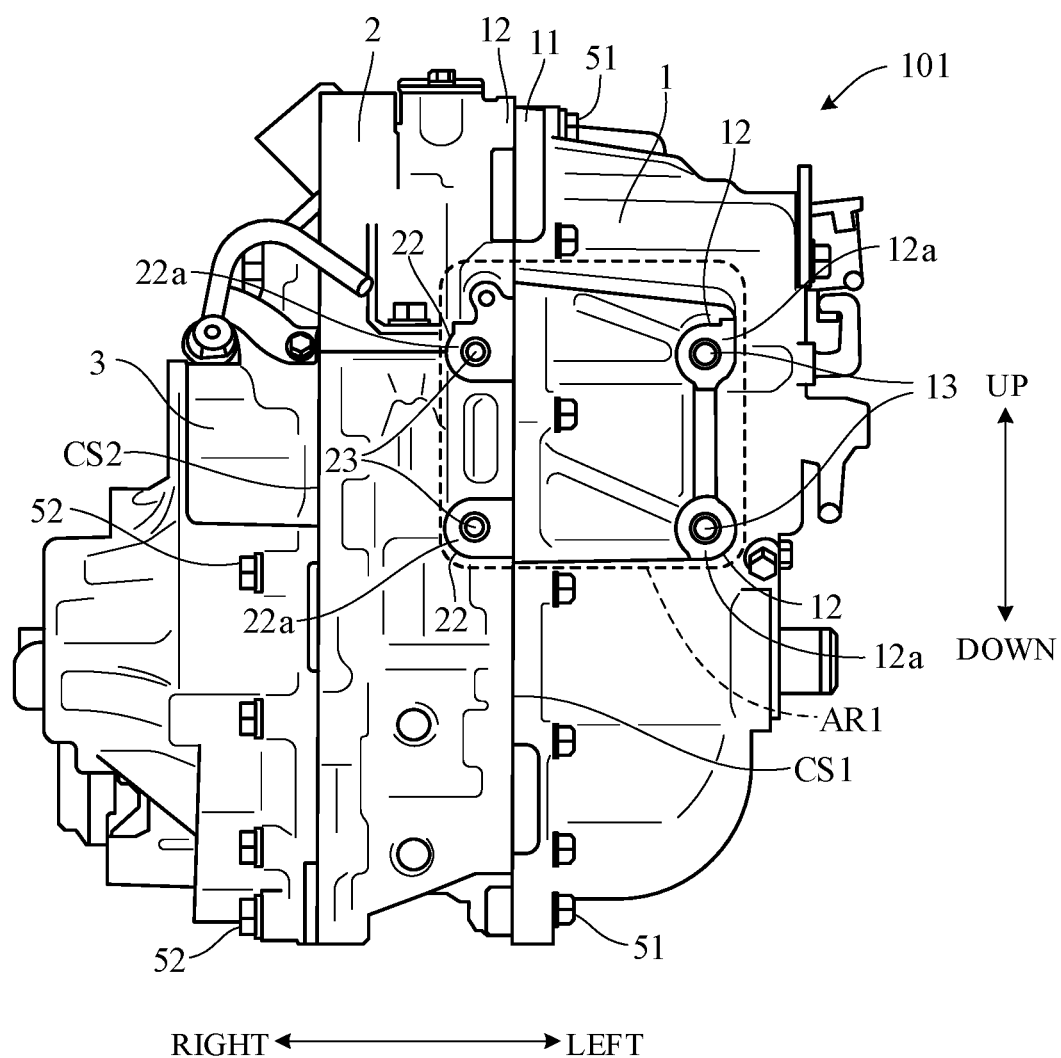
FIG. 8 is a front view of a case of a vehicle drive unit in accordance with an embodiment of the present invention taken from ahead.

Configuration of the first attachment region AR1 is explained in detail in the following. FIG. 7 is a perspective diagram viewing the case 101 (motor cover 1, motor cover 1 and gear cover 3) from obliquely right-forward in assembled state of the vehicle drive unit 100, and FIG. 8 is a front view of the case 101 taken from ahead. Illustration of the mounts 4 is omitted in FIGS. 7 and 8. As shown in FIGS. 7 and 8, flanges 11 and 21 are provided circumferentially along the coupling plane CS1 of the motor cover 1 and gear case 2, and the flanges 11 and 21 are fastened together by multiple circumferentially spaced bolts 51.

In the first attachment region AR1 are provided a pair of upper and lower attachment portions 12 provided on the motor cover 1 and a pair of upper and lower attachment portions 22 provided on the gear case 2. The first attachment region AR1 exhibits an overall rectangular shape (square or oblong rectangular) matched to shape of rear end surface of the bracket 42 of the first mount 4A (FIG. 5A).

The attachment portions 12 and 22 are formed to rise like roughly columnar bosses whose end faces (front end faces) 12a and 22a protrude farther forward than front end surfaces of the flanges 11 and 21. The end faces 12a and 22a of the attachment portions 12 and 22 extend perpendicularly to the coupling plane CS1, namely, are located on one and the same laterally and vertically extending plumb plane. The end faces 12a and 22a of the attachment portions 12 and 22 are formed with screw holes 13 and 23, and the first mount 4A is fastened by screwing bolts 42a (FIG. 2) into the screw holes 13 and 23.

Since the front end portion of the first mount 4A is thus fastened to laterally straddle the coupling plane CS1 of the motor cover 1 and gear case 2, external force acting through the first mount 4A on the motor cover 1 and the gear case 2 occurs at the same time and in the same direction. As a result, external force transmitted from the vehicle frame 200 through the first mount 4A can be prevented from causing relative displacement between case components at the coupling plane CS1. As rigidity and strength of the whole case are therefore increased, adequate sealing performance at the coupling plane CS1 is ensured.

Moreover, the fact that the first mount 4A extends laterally, i.e., perpendicular to the coupling plane CS1, ensures that forward-rearward relative displacement of the motor cover 1 and gear case 2 joined through the coupling plane CS1 can be thoroughly restrained when large external force acts in forward-rearward direction of the vehicle such as during vehicle drive-off, acceleration and deceleration. The issue here is that the motor cover 1 and gear case 2 are fastened together by the multiple circumferentially spaced bolts 51 and therefore tend to sustain relative displacement more easily in longitudinal direction than in lateral direction. Regarding this point, since in the present embodiment the first mount 4A is installed to laterally straddle the coupling plane CS1, relative longitudinal displacement is effectively restrained. In addition, the first mount 4A is installed at the forward surplus space SP2 of the motor cover 1 (FIG. 3). This helps to minimize enlargement of the vehicle drive unit 100 as a whole.

Figure 9:
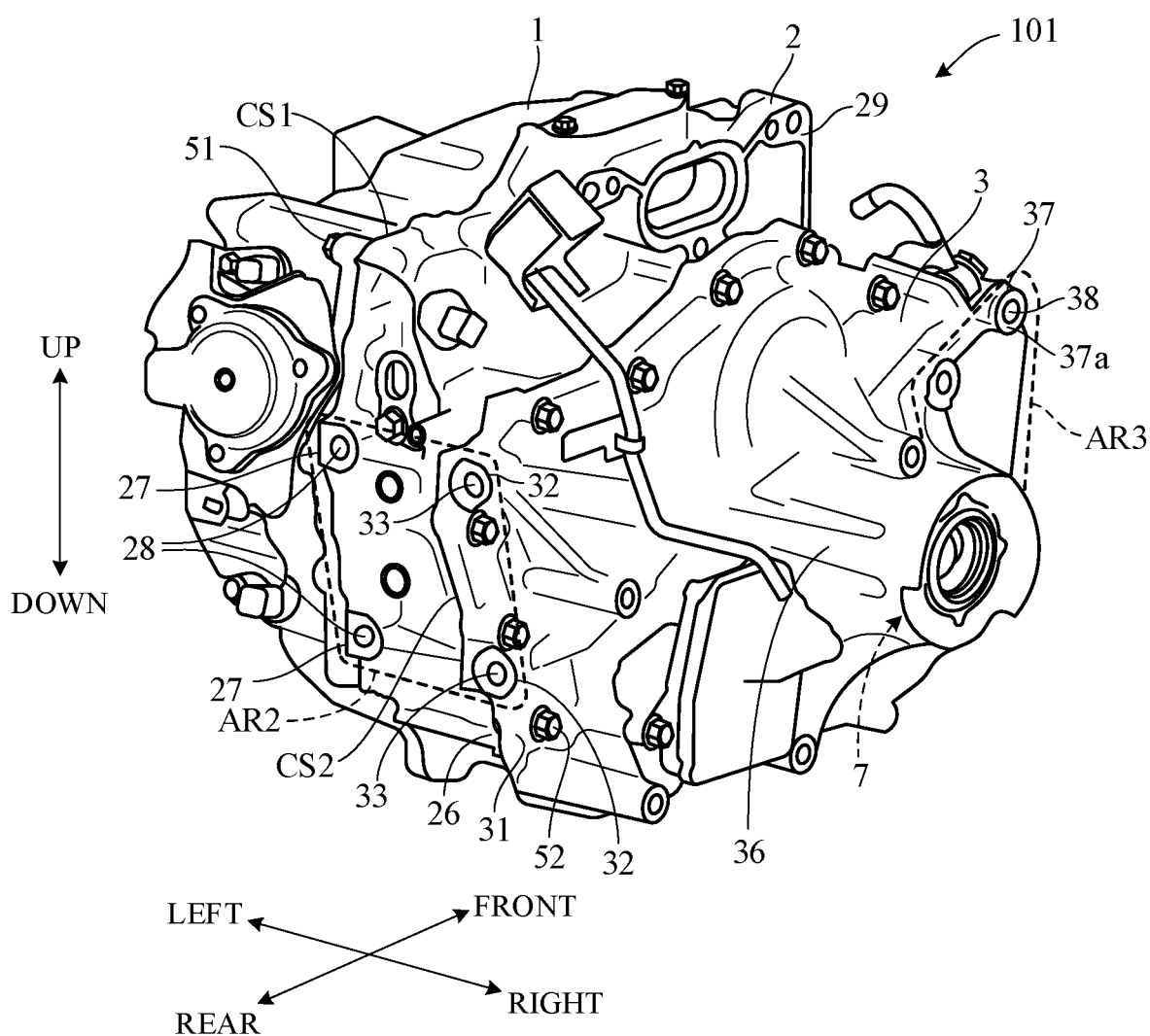
FIG. 9 is a perspective diagram viewing a case of a vehicle drive unit in accordance with an embodiment of the present invention from obliquely right-reward.
Figure 10:
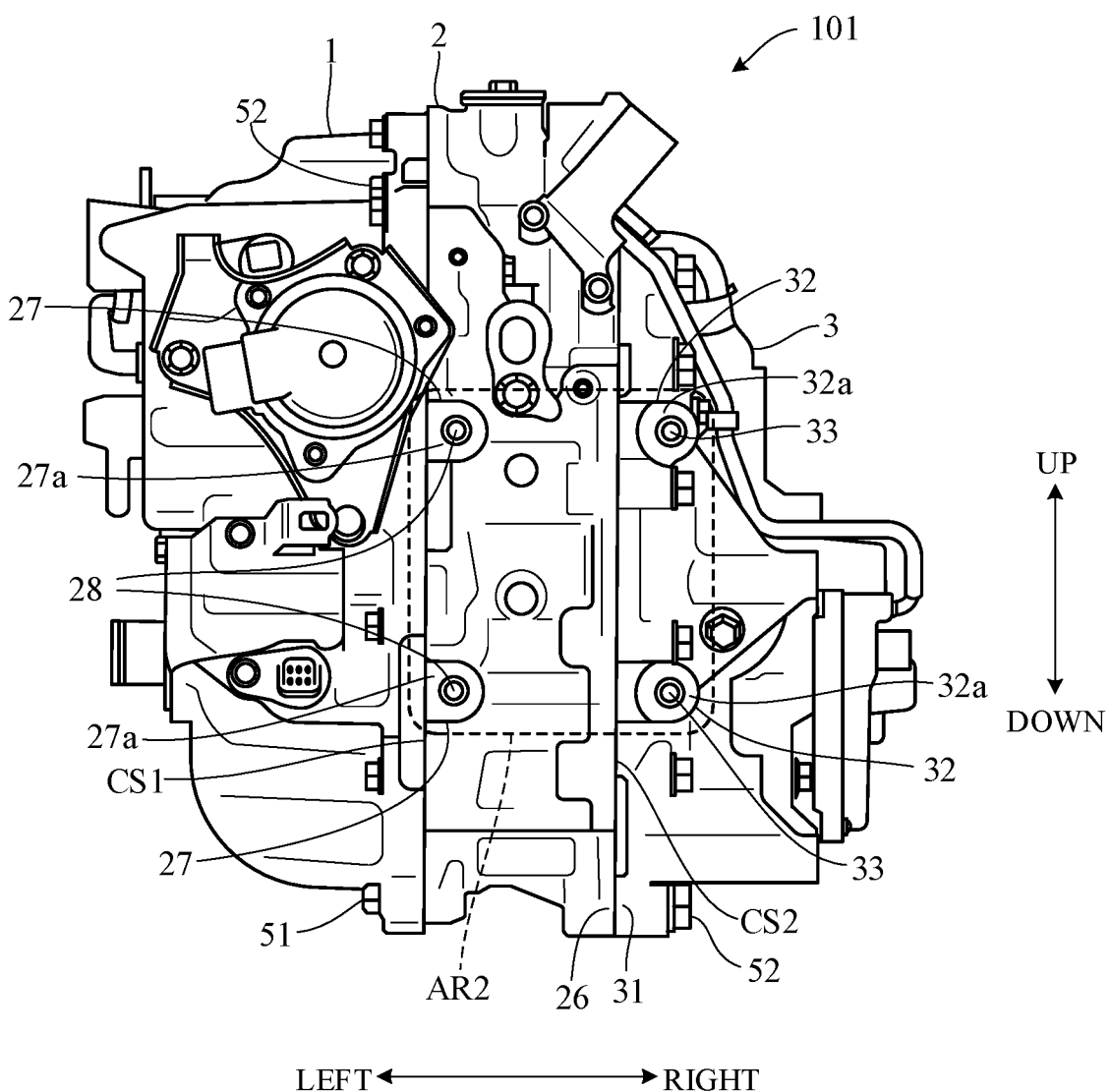
FIG. 10 is a rear view of a case of a vehicle drive unit in accordance with an embodiment of the present invention taken from behind.

Next, configuration of the second attachment region AR2 is explained in detail. FIG. 9 is a perspective diagram viewing the case 101 from obliquely right-rearward in assembled state of the vehicle drive unit 100, and FIG. 10 is a rear view of the case 101 taken from behind. Illustration of the mounts 4 is omitted in FIGS. 9 and 10. As shown in FIGS. 9 and 10, flanges 26 and 31 are provided circumferentially along the coupling plane CS2 of the gear case 2 and gear cover 3, and the flanges 26 and 31 are fastened together by multiple circumferentially spaced bolts 52.

As shown in FIGS. 7 and 9, upper end portion of the gear cover 3 is positioned lower than upper end portion of the gear case 2, and an attachment surface 29 for attaching the power control unit 9 (FIGS. 1A and 1B) is formed on right end surface of the gear case 2 above the gear cover 3. The part of the gear cover 3 accommodating the differential mechanism 7 protrudes rightward to form a protrusion 36. The power control unit 9 attached to the attachment surface 29 is installed to project rightward of the gear cover 3 into space above and rearward of the protrusion 36.

As shown in FIGS. 9 and 10, in the second attachment region AR2 are provided a pair of upper and lower attachment portions 27 provided on the gear case 2 and a pair of upper and lower attachment portions 32 provided on the gear cover 3. The second attachment region AR2 exhibits an overall rectangular shape (square or oblong rectangular) matched to shape of front end surface of the bracket 42 of the second mount 4B.

The attachment portions 27 and 32 are formed to rise like roughly columnar bosses whose end faces (rear end faces) 27a and 32a protrude farther rearward than rear end surfaces of the flanges 26 and 31. The end faces 27a and 32a of the attachment portions 27 and 32 extend perpendicularly to the coupling plane CS2, namely, are located on one and the same laterally and vertically extending plumb plane. The end faces 27a and 32a of the attachment portions 27 and 32 are formed with screw holes 28 and 33, and the second mount 4B is fastened by screwing bolts 42a (FIG. 2) into the screw holes 28 and 33.

Since the rear end portion of the second mount 4B is thus fastened to laterally straddle the coupling plane CS2 of the gear case 2 and gear cover 3, external force acting through the second mount 4B on the gear case 2 and the gear cover 3 occurs at the same time and in the same direction. As a result, external force transmitted from the vehicle frame 200 through the second mount 4B can be prevented from causing relative displacement between case components at the coupling plane CS2. As rigidity and strength of the whole case are therefore increased, adequate sealing performance at the coupling plane CS2 is ensured.

Moreover, the fact that the second mount 4B extends laterally, i.e., perpendicular to the coupling plane CS2, ensures that forward-rearward relative displacement of case components joined through the coupling plane CS2 can be thoroughly restrained when large external force acts in forward-rearward direction of the vehicle such as during vehicle drive-off, acceleration and deceleration. The issue here is that the gear case 2 and gear cover 3 are fastened together by the multiple circumferentially spaced bolts 52 and therefore tend to sustain relative displacement more easily in longitudinal direction than in lateral direction. Regarding this point, since in the present embodiment the second mount 4B is installed to laterally straddle the coupling plane CS2, relative longitudinal displacement is effectively restrained.

Moreover, as shown in FIG. 6, a straight line LN1 (only one dotted line shown) connecting the attachment portion 22 (positions where first mount 4A is fastened to front end surface of gear case 2) and the attachment portion 27 (positions where second mount 4B is fastened to rear end surface of gear case 2) extend longitudinally. Namely, lateral positions of the attachment portions 22 and 27 are coincident. Owing to this configuration, bending load on the case 101 caused by longitudinal external force acting on the case 101 through the attachment portions 22 and 27 can be suppressed to minimize deformation of the case 101.

Next, configuration of the third attachment region AR3 is explained in detail. As shown in FIGS. 7 and 9, the third attachment region AR3 is formed on right end surface of the gear cover 3 forward and upward of the protrusion 36. In the third attachment region AR3 are formed multiple (four) attachment portions 37 provided on the gear cover 3 along vertical and longitudinal directions. The third attachment region AR3 exhibits a shape matched to shape of left end surface of the bracket 47 of the third mount 4C.

The attachment portions 37 are formed to rise like roughly columnar bosses whose end faces (right end faces) 37a extend parallel to the coupling plane CS2, namely, are located on one and the same longitudinally and vertically extending imaginary plumb plane. The end faces 37a of the attachment portions 37 are formed with screw holes 38, and the third mount 4C is fastened by screwing bolts 47a (FIG. 2) into the screw holes 38. The third mount 4C is installed at the rightward surplus space SP3 of the gear cover 3 (FIG. 3). This helps to minimize enlargement of the vehicle drive unit 100 as a whole. In particular, the fact that the third mount 4C is attached to the right end surface of the gear cover 3 prevents protrusion of the third mount 4C forward of the front end portion of the gear cover 3 or minimizes protrusion of the third mount 4C forward of the front end portion of the gear cover 3.

The present embodiment can achieve advantages and effects such as the following:

(1) The vehicle drive unit 100 comprises: the motor cover 1 and the gear case 2 joined together along the coupling plane CS1 to form the internal hermetically sealed space SP1; the electric motor 5 and other drive members accommodated in the hermetically sealed space SP1 for generating travel driving force (vehicle propelling force); and the first mount 4A interposed between the integrally joined case 101 and vehicle frame 200 to support the case 101 (motor cover 1 and gear case 2) from the vehicle frame 200 (FIG. 2). The motor cover 1 and the gear case 2 respectively comprise the attachment portions 12 and 22 to which the first mount 4A is attached, and the attachment portions 12 and 22 are installed in a single region (one and the same first attachment region AR1) straddling the coupling plane CS1 (FIG. 8). As a result, external force acting through the first mount 4A on the motor cover 1 and the gear case 2 occurs at the same time and in the same direction. As a result, relative displacement between the motor cover 1 and gear case 2 at the coupling plane CS1 is prevented and sealing performance at the coupling plane CS1 is ensured.

(2) The attachment portions 12 and 22 to which the first mount 4A is attached are formed in one and the same plane (FIG. 7). Since external force therefore more certainly acts through the first mount 4A on the motor cover 1 and gear case 2 simultaneously and in the same direction, adequate sealing performance at the coupling plane CS1 is ensured.

(3) The coupling plane CS1 extends longitudinally and the attachment portions 12 and 22 are installed in lateral direction lying approximately perpendicular thereto. Relative displacement in slipping direction of the coupling plane CS1 (longitudinal direction) can therefore be effectively prevented by the first mount 4A.

(4) Although large external force tends to act in vehicle longitudinal direction during drive-off, acceleration, deceleration and the like in this case, the provision of the attachment portions 12 and 22 in lateral direction effectively restrains relative longitudinal displacement between case components joined through the coupling plane CS1.

(5) The vehicle drive unit 100 further comprises the second mount 4B which, in contrast to the first mount 4A attached at front end surface of the motor cover 1 and gear case 2, is attached at rear end surface of the gear case 2 (FIG. 2). The provision of mounts 4 at opposite longitudinal ends of the case 101 in this manner efficiently restrains relative displacement between case components.

(6) The imaginary line LN1 connecting the attachment portion 22 of the first mount 4A at front end surface of the gear case 2 and the attachment portion 27 of the second mount 4B at rear end surface of the gear case 2 extends parallel to the coupling plane CS1 (FIG. 6). Action of bending load or the like on the case 101 owing to external force acting through the mounts 4A and 4B is therefore restrained.

(7) In addition to the motor cover 1 and the gear case 2, the case 101 of the vehicle drive unit 100 further comprises the gear cover 3 joined to the gear case 2 along the coupling plane CS2 parallel to the coupling plane CS1 (FIG. 2). The gear case 2 and gear cover 3 respectively have attachment portions 27 and 32 at their rear end surfaces for attaching the second mount 4B, and the attachment portions 27 and 32 are provided in a single region (one and the same second attachment region AR2) straddling the coupling plane CS2 (FIG. 10). External force transmitted through the second mount 4B therefore acts on the gear case 2 and gear cover 3 simultaneously and in the same direction. As a result, relative displacement can be prevented not only between the motor cover 1 and gear case 2 in the coupling plane CS1 but also between the gear case 2 and gear cover 3 in the coupling plane CS2.

(8) The vehicle drive unit 100 further comprises the third mount 4C attached to the attachment portion 37 provided on right end surface of the gear cover 3 (FIG. 6). Since the case 101 therefore comes to be supported not only longitudinally but also laterally. the case 101 is effectively supported by the three mounts 4A to 4C.

(9) The vehicle drive unit 100 comprises the electric motor 5 accommodated in the motor cover 1 to rotate around the lateral axis CL1 and further comprises the differential mechanism 7 that rotates around the lateral axis CL2 forward of the axis CL1 and distributes driving torque output from the electric motor 5 to left and right drive wheels (left side and right side) (FIG. 3). With this configuration, the gear cover 3 that accommodates the differential mechanism 7 protrudes forward of the motor cover 1, so that the surplus space SP2 arises forward of the motor cover 1. The first mount 4A can be efficiency installed in this surplus space SP2. Namely, although in a case where mounts 4 are installed forward of the motor cover 1 overall size of the vehicle drive unit increases in proportion, the installation of mounts 4 forward of the motor cover 1 minimizes increase in the overall size of the vehicle drive unit.

(10) The motor cover 1, gear case 2 and gear cover 3 respectively have the flanges 11, 21 and 31 around their respective coupling planes CS1 and CS2 (FIGS. 7 to 10). The attachment portions 12, 22 and 27, 32 of the first mount 4A and second mount 4B are respectively installed in one and the same attachment regions AR1 and AR2 straddling these flanges 11, 21 and 31. Since the attachment portions 12, 22 and 27, 32 therefore come to be provided at high-rigidity locations near the flanges 11, 21 and 31, displacement in the vicinity of the attachment portions of the case 101 is therefore thoroughly restrained.

Various modifications of the aforesaid embodiment are possible. Some examples are explained in the following. While, in the aforesaid embodiment (FIG. 6), the case 101 is formed of the motor cover 1 (first case) including the attachment portion 12 (first attachment portion) at the front end surface thereof, the gear case 2 (second case) including the attachment portions 22 and 27 (second attachment portion and third attachment portion) at the front end surface and the rear end surface thereof, respectively, and the gear cover 3 (third case) including the attachment portions 32 and 37 (fourth attachment portion and fifth attachment portion) at the rear end surface and the right end surface thereof, respectively, the case 101 can be of any configuration. For example, a housing may be formed of two cases or more than three cases. Accordingly, a configuration and the number of mount members supported a housing from a vehicle flame are not limited to those described above.

Figure 11:
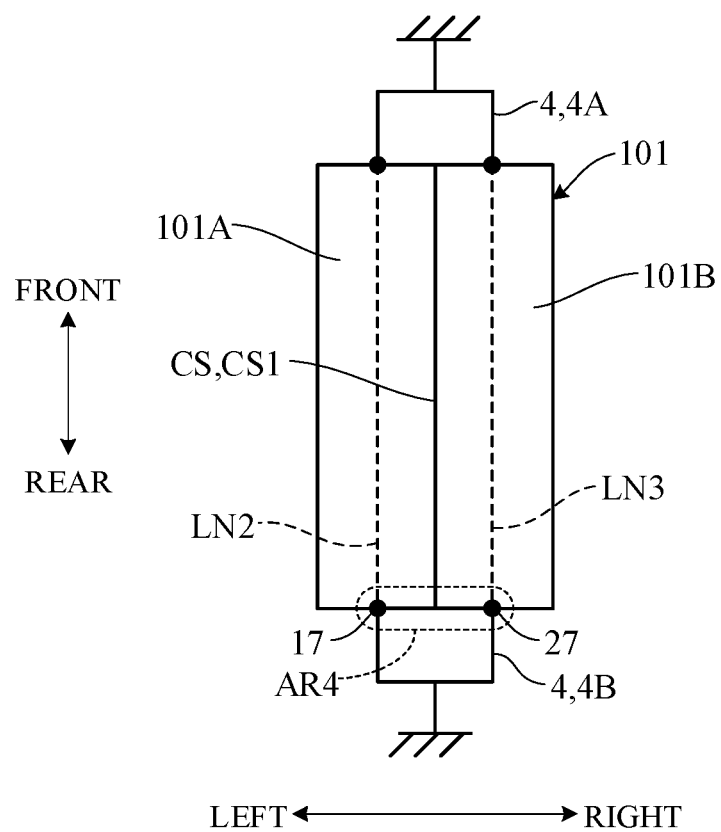
FIG. 11 is a. diagram schematically illustrating a modification of a vehicle drive unit in accordance with an embodiment of the present invention.

In the aforesaid embodiment (FIG. 6), the imaginary line LN1 connecting the attachment portion 22 of the first mount 4A of the gear case 2 and attachment portion 27 of the second mount 4B is defined to extend parallel to the coupling plane CS1 but perfect parallelism is not required and approximate parallelism suffices to restrain bending load. Optionally, therefore, imaginary line connecting the second attachment portions and third attachment portions can extend in directions not parallel to the direction in which the coupling plane between the first case and second case extends. For example, they can extend roughly parallel (approximately parallel). In the aforesaid embodiment (FIG. 6), the mounts 4A and 4B are attached to straddle the common coupling planes CS1 and CS2 on only front side or only rear side but, as shown schematically in FIG. 11, for example, pairs of front/rear mounts 4 can be attached to straddle both the front side and rear side of coupling plane CS of a pair of right and left case components 101A and 101B. In such case, imaginary lines LN2 and LN3 (dotted lines) connecting attachment portions of the front and rear mounts 4 are preferably parallel or approximately parallel to the coupling plane CS. The case components 101A and 101B can be any of the motor cover 1, gear case 2 and gear cover 3. For example, as shown in FIG. 11, mounts 4A and 4B can be attached at both front and rear end surfaces the motor cover 1 and gear case 2 so as to straddle the coupling plane CS1 of the motor cover 1 and gear case 2. In this case, attachment portions of the rear end surface mount 4B of the motor cover 1 and gear case 2, i.e., fourth attachment portions 17 and third attachment portions 27, are provided in one and the same attachment region AR4 straddling the coupling plane CS1. Alternatively, mounts can be attached to both front and rear end surfaces of the gear case 2 and gear cover 3 so as to straddle the coupling plane CS2 of the gear case 2 and gear cover 3.

In the aforesaid embodiment (FIG. 6), the motor cover 1 and gear case 2 are joined through the coupling plane CS1 (first coupling plane) extending in longitudinal (first direction) and the gear case 2 and gear cover 3 are joined through a coupling plane (second coupling plane) extending in longitudinal direction, but the number of coupling planes through which case components are joined is not limited to the foregoing. When the case consists of two components, the number of coupling planes is one, and when the case has four or more case components, the number of coupling planes is three or more. In the aforesaid embodiment, first direction in which the coupling planes CS1 and CS2 extend is defined as longitudinal direction and second direction in which pairs of attachment portions 12, 22 and 27, 32 extend relative to these coupling planes CS1 and CS2 is defined as lateral direction, but the first and second directions are not limited to the aforesaid. For example, the first direction can be defined as lateral direction and the second direction as longitudinal direction, and the first direction and second direction need not be perpendicular.

In the aforesaid embodiment, while the end surface of a pair of attachment portions 12, 22 and the end surface of a pair of attachment portions 27, 32 to which the mount 4 is attached are respectively installed on one and the same plane, an end surface of a pair of attachment portions may not be installed on one and the same plane insofar as a pair of attachment portions is installed in a single region straddling a coupling plane. In a case where an end surface of a pair of attachment portions has difference in level, a mount may be formed in accordance with form of the difference. In the aforesaid embodiment, while a drive member generating a travel driving force of the vehicle has the electric motor 5, a drive member may include an internal combustion engine in addition to an electric motor or instead of an electric motor. In the aforesaid embodiment, while the vehicle drive unit 100 is supported from the vehicle frame 200 located toward back of the vehicle, a vehicle drive unit may be supported from another position such as a vehicle frame located toward front of a vehicle.

The above embodiment can be combined as desired with one or more of the above modifications. The modifications can also be combined with one another.

According to the present invention, a mount is attached to an attachment portion installed in a single region straddling a coupling plane of a pair of cases. Thus, it is possible to restrain relative displacement between a pair of cases and ensure adequate sealing performance between cases.

Above, while the present invention has been described with reference to the preferred embodiments thereof, it will be understood, by those skilled in the art, that various changes and modifications may be made thereto without departing from the scope of the appended claims.

What is claimed is:

1. A vehicle drive unit supported by a vehicle frame of a vehicle, the vehicle drive unit comprising:
   a housing including a first case and a second case integrally joined together along a coupling plane to form a sealed space therein;
   a drive member accommodated in the sealed space to generate a travel driving force of the vehicle; and
   a mount member interposed between the housing and the vehicle frame to support the housing from the vehicle frame, wherein
   the first case and the second case respectively include a first attachment portion and a second attachment portion to which the mount member is attached, and the first attachment portion and the second attachment portion are installed in a single region intersecting with the coupling plane,
   the coupling plane extends in a first direction,
   the first attachment portion and the second attachment portion respectively include an attachment surface of the mount member along a second direction approximately perpendicular to the first direction, the mount member is a first mount member attached on one end surface of the first case and the second case in the first direction, and the vehicle drive unit further comprises a second mount member interposed between another end surface of the second case in the first direction and the vehicle frame to support the housing from the vehicle frame, and the second case further includes a third attachment portion to which the second mount member is attached, on the other end surface of the second case in the first direction.

2. The vehicle drive unit according to claim 1, wherein the first attachment portion and the second attachment portion are formed in one and the same plane.

3. The vehicle drive unit according to claim 1, wherein one of the first direction and the second direction is a back and forth direction of the vehicle, and another is a left and right direction of the vehicle.

4. The vehicle drive unit according to claim 1, wherein the third attachment portion is installed so that an imaginary line connecting the second attachment portion and the third attachment portion extends parallel or approximately parallel to the first direction.

5. The vehicle drive unit according to claim 1, wherein the coupling plane is a first coupling plane, the housing further includes a third case joined to the second case along a second coupling plane parallel to the first coupling plane, the second case being sandwiched between the first case and the third case, the third case includes a fourth attachment portion to which the second mount member is attached, the third attachment portion and the fourth attachment portion are installed in a single region straddling the second coupling plane.

6. The vehicle drive unit according to claim 5, wherein the vehicle drive unit further comprises a third mount member interposed between the housing and the vehicle frame to support the housing from the vehicle frame, and the third case further includes a fifth attachment portion installed at one end part in the second direction and to which the third mount member is attached.

7. The vehicle drive unit according to claim 5, wherein the drive member includes an electric motor configured to rotate around a first axis extending in a direction perpendicular to the coupling plane, and a differential mechanism configured to rotate around a second axis extending parallel to the first axis on a side closer to the first attachment portion than the first axis and distribute a driving torque output from the electric motor to left side and right side, the electric motor is accommodated in the first case.

8. The vehicle drive unit according to claim 1, wherein the first case further includes a fourth attachment portion to which the second mount member is attached, on another end surface of the first case in the first direction, and the third attachment portion and the fourth attachment portion are installed in a single region straddling the coupling plane.

9. The vehicle drive unit according to claim 1, wherein the first case and the second case include a flange around the coupling plane, and the first attachment portion and the second attachment portion are installed in a single region straddling the flange.

10. The vehicle drive unit according to claim 1, wherein the single region exhibits a roughly rectangular shape.

* * * * *